(12) United States Patent
Westwood

(10) Patent No.: US 7,669,711 B1
(45) Date of Patent: Mar. 2, 2010

(54) DISK PACK BALANCING STATION

(75) Inventor: Barnaby Brian Westwood, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 1169 days.

(21) Appl. No.: 11/253,349

(22) Filed: Oct. 19, 2005

(51) Int. Cl.
*G11B 5/127* (2006.01)
(52) U.S. Cl. .................... 206/307; 29/603.03; 29/737
(58) Field of Classification Search .............. 360/98.08, 360/99.08, 99.05, 99.12; 29/603.03, 603.09, 29/830, 834, 603.1, 737; 73/487; 206/308.1, 206/527, 307
See application file for complete search history.

(56) References Cited

U.S. PATENT DOCUMENTS

| 4,683,505 | A | 7/1987 | Schmidt et al. |
| 5,811,678 | A | 9/1998 | Hirano |
| 5,824,898 | A | 10/1998 | Brooks et al. |
| 6,101,876 | A | 8/2000 | Brooks et al. |
| 6,158,112 | A | 12/2000 | Kim et al. |
| 6,484,575 | B2 | 11/2002 | Horning et al. |
| 6,651,311 | B1 | 11/2003 | Kim et al. |
| 6,707,639 | B1 | 3/2004 | Pfeiffer et al. |
| 6,822,826 | B2 | 11/2004 | Choo et al. |
| 6,839,956 | B2 * | 1/2005 | Watanabe et al. ......... 29/603.03 |
| 6,971,154 | B2 * | 12/2005 | Yoo et al. ................. 29/603.03 |
| 2002/0112342 | A1 * | 8/2002 | Guthrie et al. ........... 29/603.03 |

* cited by examiner

*Primary Examiner*—Jacob K Ackun, Jr.
(74) *Attorney, Agent, or Firm*—Howard H. Sheerin, Esq.

(57) ABSTRACT

A disk pack balancing station is disclosed for balancing a disk pack assembly, the disk pack assembly comprising a plurality of components including a plurality of disks coupled to a hub of a spindle motor with at least one disk spacer between the disks. The disk pack balancing station comprises a first biasing arm rotated about a pivot to apply a first biasing force to a first component of the disk pack assembly, and a second biasing arm moved linearly to apply a second biasing force to a second component of the disk pack assembly. This configuration enables the disk pack balancing station to balance a number of different disk pack assemblies, including a disk pack comprising an even number of disks and a disk pack including an odd number of disks.

9 Claims, 7 Drawing Sheets

DISK PACK BALANCING STATION

BACKGROUND OF THE INVENTION

1. Field of the Invention

The present invention relates to the assembly of disk drives for computer systems. More particularly, the present invention relates to a disk pack balancing station.

2. Description of the Prior Art

FIG. 1 shows an exploded view of a prior art disk drive comprising a disk pack assembly including a plurality of disks 2 clamped to a hub of a spindle motor 4 using a disk clamp 6, wherein a disk spacer 8 is inserted between the disks 2. The spindle motor 4 rotates the disks 2 while a plurality of heads 10 coupled to the distal ends of actuator arms 12 access respective disk surfaces (e.g., top and bottom disk surfaces). For clarity, only one head 10 and actuator arm 12 are shown in the example of FIG. 1; in practice, a number of actuator arms 12 and heads 10 are employed in an E-block configuration.

The actuator arms 12 are rotated about a pivot 14 by a voice coil motor (VCM) in order to actuate the heads 10 over the respective disk surfaces. The VCM comprises a voice coil 16 coupled to the base of the actuator arms 12 and one or more permanent magnets attached to a yoke 18. When the voice coil 16 is energized with current, the resulting magnetic flux interacts with the magnetic flux of the permanent magnets to generate a torque that rotates the actuator arms 12 about the pivot 14. A tang 20 attached to the actuator arms 12 interacts with a crash stop 22 to limit the stroke of the actuator arms 12, and also provides a latching mechanism (e.g., using a magnet) to maintain the actuator arms 12 in a latched position while the disk drive is powered down. Alternatively, the actuator arms 12 may be parked on a ramp mounted at the outer periphery of the disks 2 when the disk drive is powered down.

It is important to manufacture the disk pack assembly so that it is properly balanced to minimize disk wobble. One known technique for balancing the disk pack assembly is to use a disk pack balancing station which measures the disk pack imbalance and then inserts a wire of appropriate length and orientation to counteract the disk pack imbalance. A problem with this wire balance technique, however, is that it may require a large number of different length wires to compensate for a wide distribution of imbalance for the disk pack assemblies, which increases the manufacturing cost. The number of wires may be reduced by manufacturing the disks and spindle motor with a tighter tolerance, but this also increases the manufacturing cost.

There is, therefore, a need to improve disk pack balancing when manufacturing a disk drive.

SUMMARY OF THE INVENTION

An embodiment of the present invention comprises a disk pack balancing station for balancing a disk pack assembly, the disk pack assembly comprising a plurality of components including a plurality of disks coupled to a hub of a spindle motor with at least one disk spacer between the disks. The disk pack balancing station comprises a first biasing arm rotated about a pivot to apply a first biasing force to a first component of the disk pack assembly, and a second biasing arm moved linearly to apply a second biasing force to a second component of the disk pack assembly.

In one embodiment, the first component comprises the at least one disk spacer, and in another embodiment, the first component comprises at least one of the disks. In one embodiment, the second component comprises at least one of the disks.

In yet another embodiment, the disk pack balancing station is operable to balance a plurality of different disk pack assemblies, including a disk pack assembly comprising an odd number of disks and a disk pack assembly comprising an even number of disks. In one embodiment, if the disk pack assembly comprises an even number of disks, the first component comprises at least one of the disk spacers. In another embodiment, if the disk pack assembly comprises an odd number of disks, the first component comprises at least one of the disks.

In another embodiment, the second biasing arm comprises a swivel assembly comprising an abutment operable to rotate about a pivot. In one embodiment, the second component comprises at least two of the disks, and the abutment is operable to rotate about the pivot in order to equalize the second biasing force applied to the at least two disks.

Another embodiment of the present invention comprises a method of balancing a disk pack assembly, the disk pack assembly comprising a plurality of components including a plurality of disks coupled to a hub of a spindle motor with at least one disk spacer between the disks. The method comprises the steps of rotating a first biasing arm about a pivot to apply a first biasing force to a first component of the disk pack assembly, and moving a second biasing arm linearly to apply a second biasing force to a second component of the disk pack assembly.

DESCRIPTION OF THE PREFERRED EMBODIMENTS

Figure 1:
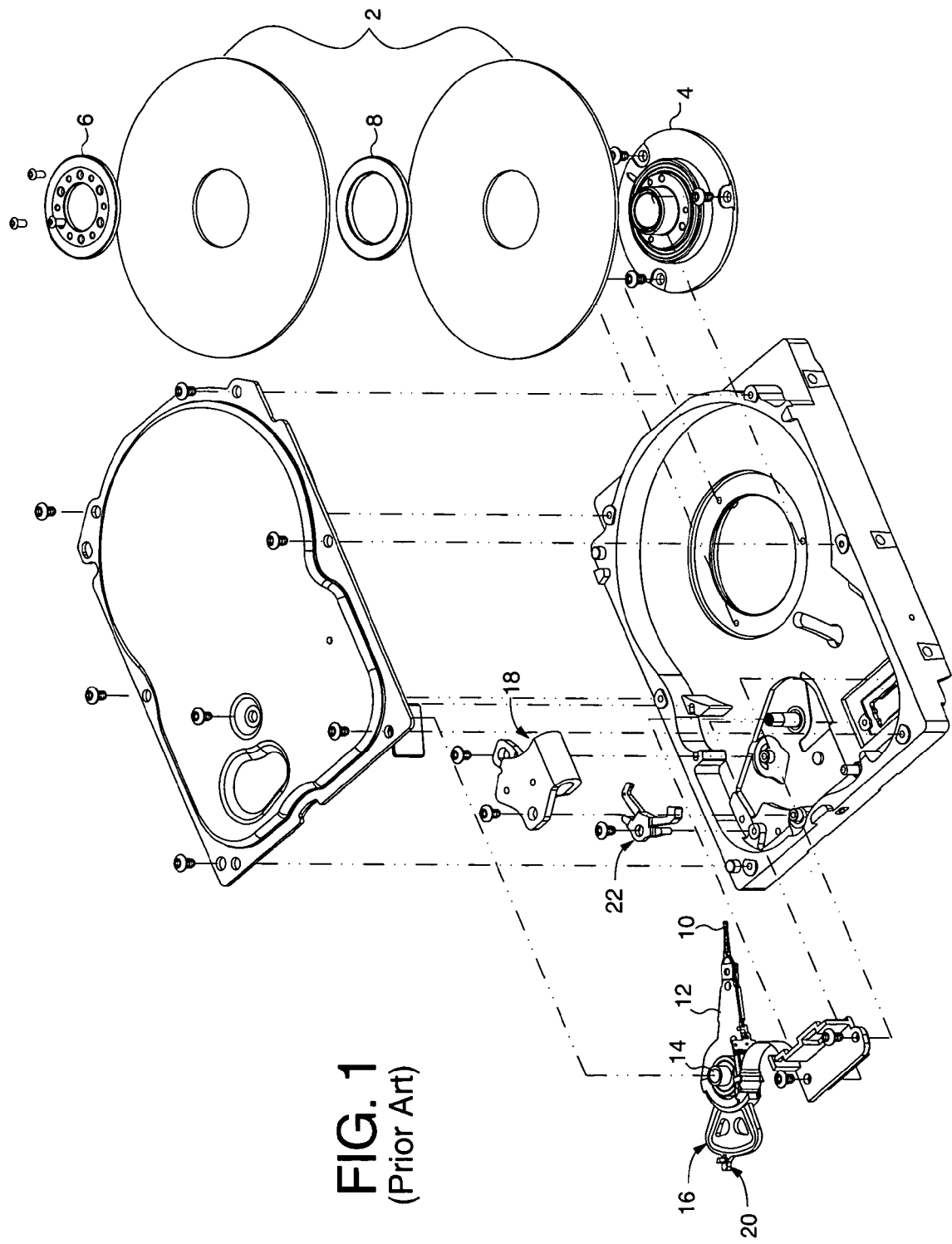
FIG. 1 shows an exploded view of a prior art disk drive including a disk pack assembly having two disks coupled to a hub of a spindle motor with a disk spacer between the disks.
Figure 2:
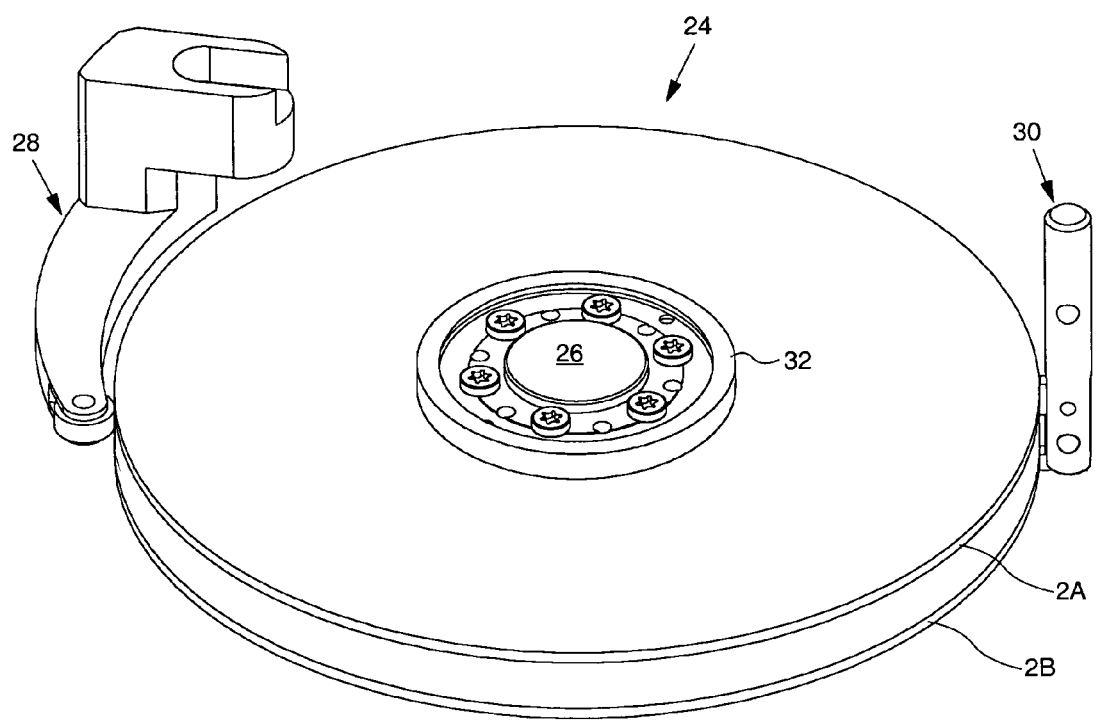
FIG. 2 shows an isometric view of a disk pack balancing station according to an embodiment of the present invention comprising a first biasing arm rotated about a pivot to apply a first biasing force to a first component of the disk pack assembly, and a second biasing arm moved linearly to apply a second biasing force to a second component of the disk pack assembly.

FIG. 2 shows an isometric view of a disk pack balancing station according to an embodiment of the present invention for balancing a disk pack assembly 24, the disk pack assembly 24 comprising a plurality of components including a plurality of disks (2A and 2B) coupled to a hub 26 of a spindle motor 4 with at least one disk spacer 8 between the disks (2A and 2B). The disk pack balancing station comprises a first biasing arm 28 rotated about a pivot to apply a first biasing force to a first component of the disk pack assembly 24, and a second biasing arm 30 moved linearly to apply a second biasing force to a second component of the disk pack assembly 24.

Figure 3:
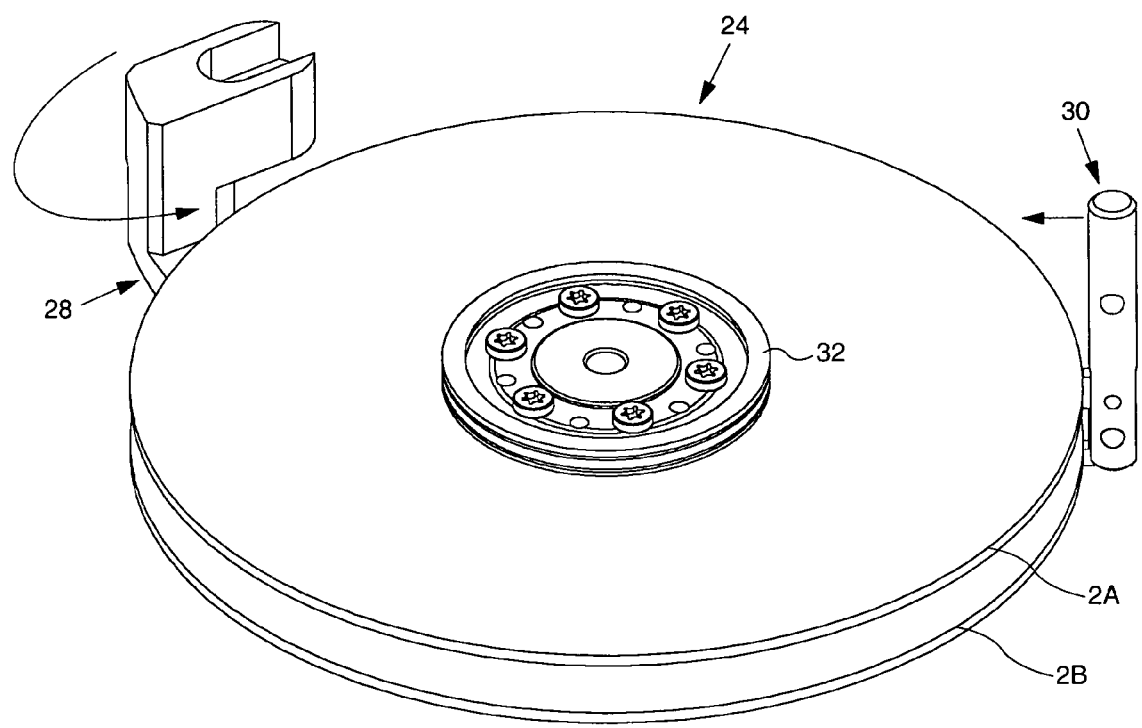
FIG. 3 shows an isometric view of the disk pack balancing station in operation wherein the first biasing arm is rotated about a pivot to engage a disk spacer, and the second biasing arm is moved linearly to engage two disks.
Figure 4:
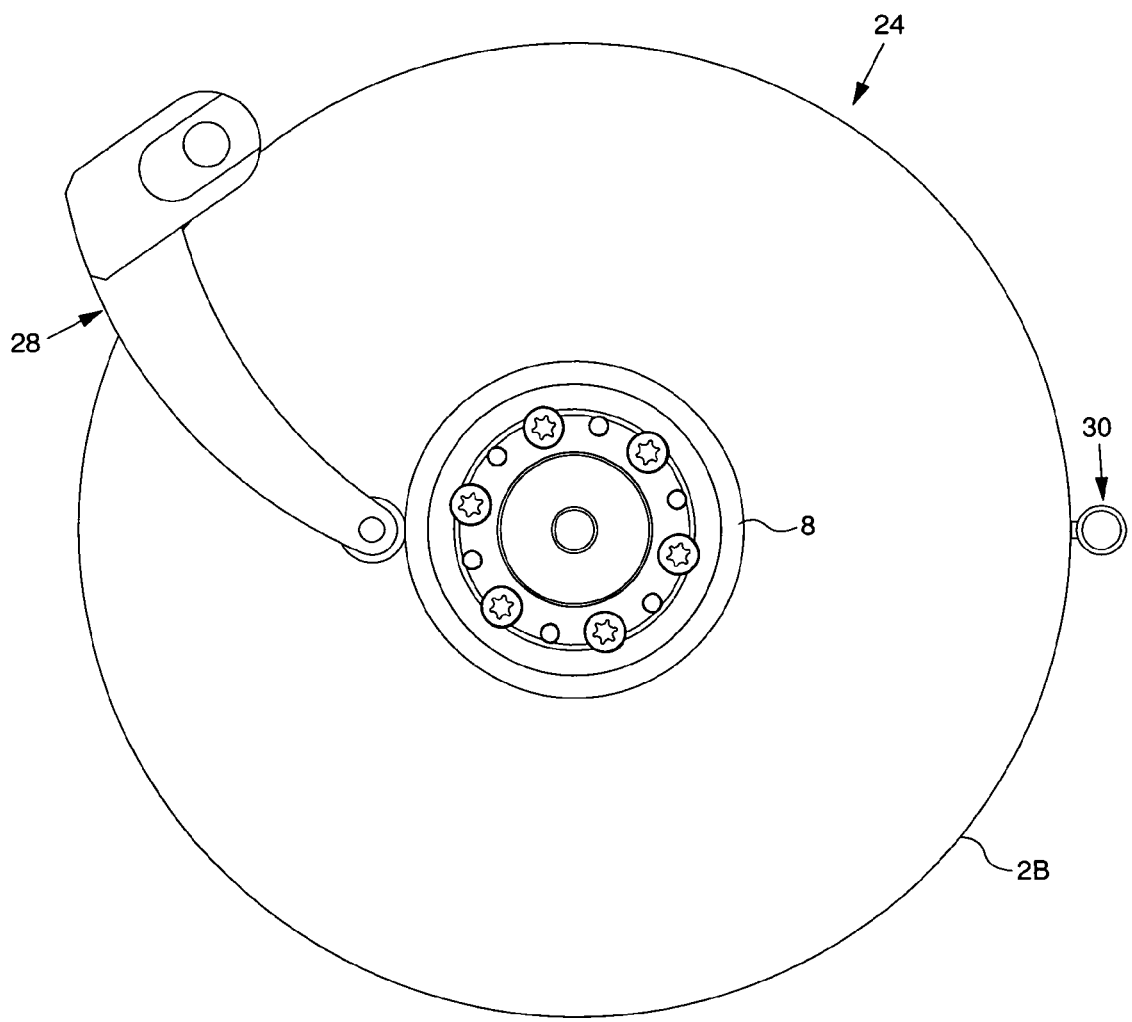
FIG. 4 shows a top view of the disk pack balancing station of FIG. 3 with the top disk removed to show the first biasing arm engaging the disk spacer.

In the embodiment of FIG. 2, the disks (2A and 2B) are coupled to the hub 26 of the spindle motor 4 using a disk clamp 32. The disk spacer 8 between the disks (2A and 2B) provides a sufficient spacing to allow the distal end of the first biasing arm 28 to fit between the disks (2A and 2B) when the first biasing arm is rotated about the pivot. This is illustrated in FIG. 3 which shows the first biasing arm 28 rotated about the pivot such that the distal end applies a first biasing force to the disk spacer 8. In this embodiment, the second biasing arm 30 is moved linearly as shown to apply an opposite biasing force to the disks (2A and 2B). FIG. 4 shows a top view of the disk pack balancing station of FIG. 3 with the top disk 2A removed for a better view of the first biasing arm 28 engaging the disk spacer 8.

In one embodiment, the screws of the disk clamp 32 are loosened so that the disk spacer 8 can move relative to the disks (2A and 2B) when the biasing forces are applied. Once the disk spacer 8 and disks (2A and 2B) have been moved into position relative to one another, the screws of the disk clamp 32 are tightened to secure the disk spacer 8 and disks (2A and 2B) into their relative positions.

Figure 5:
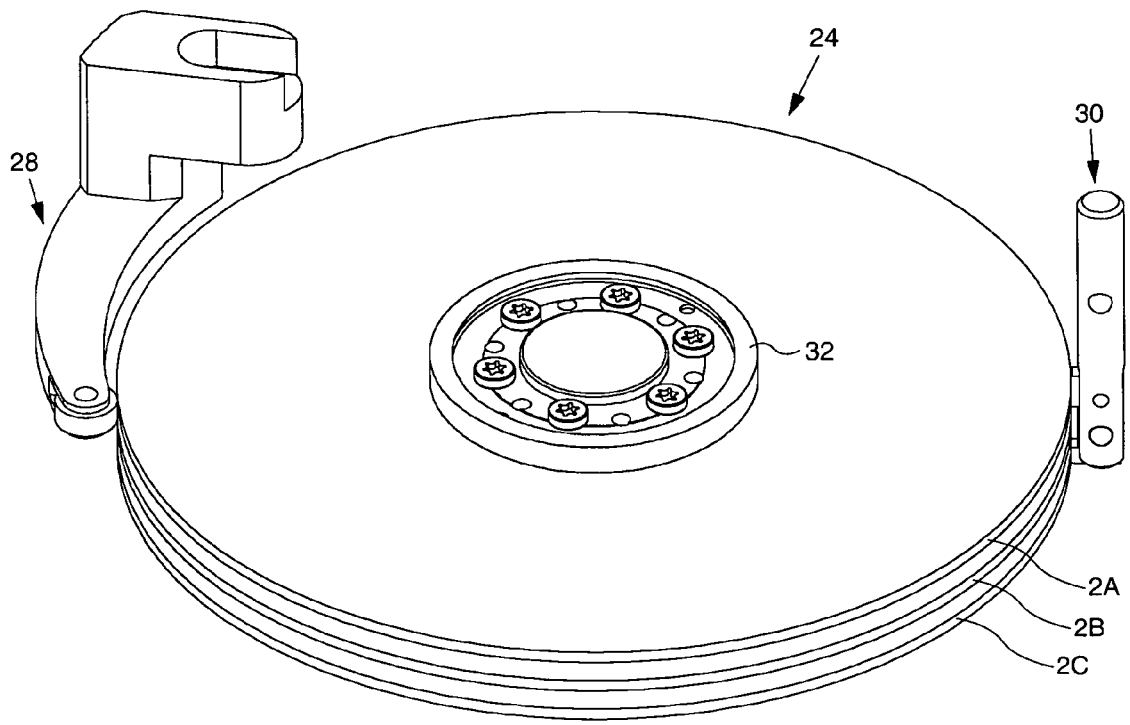
FIG. 5 shows an isometric view of a disk pack balancing station wherein the disk pack assembly comprises three disks such that the first biasing arm applies the first biasing force to the middle disk according to an embodiment of the present invention.
Figure 6:
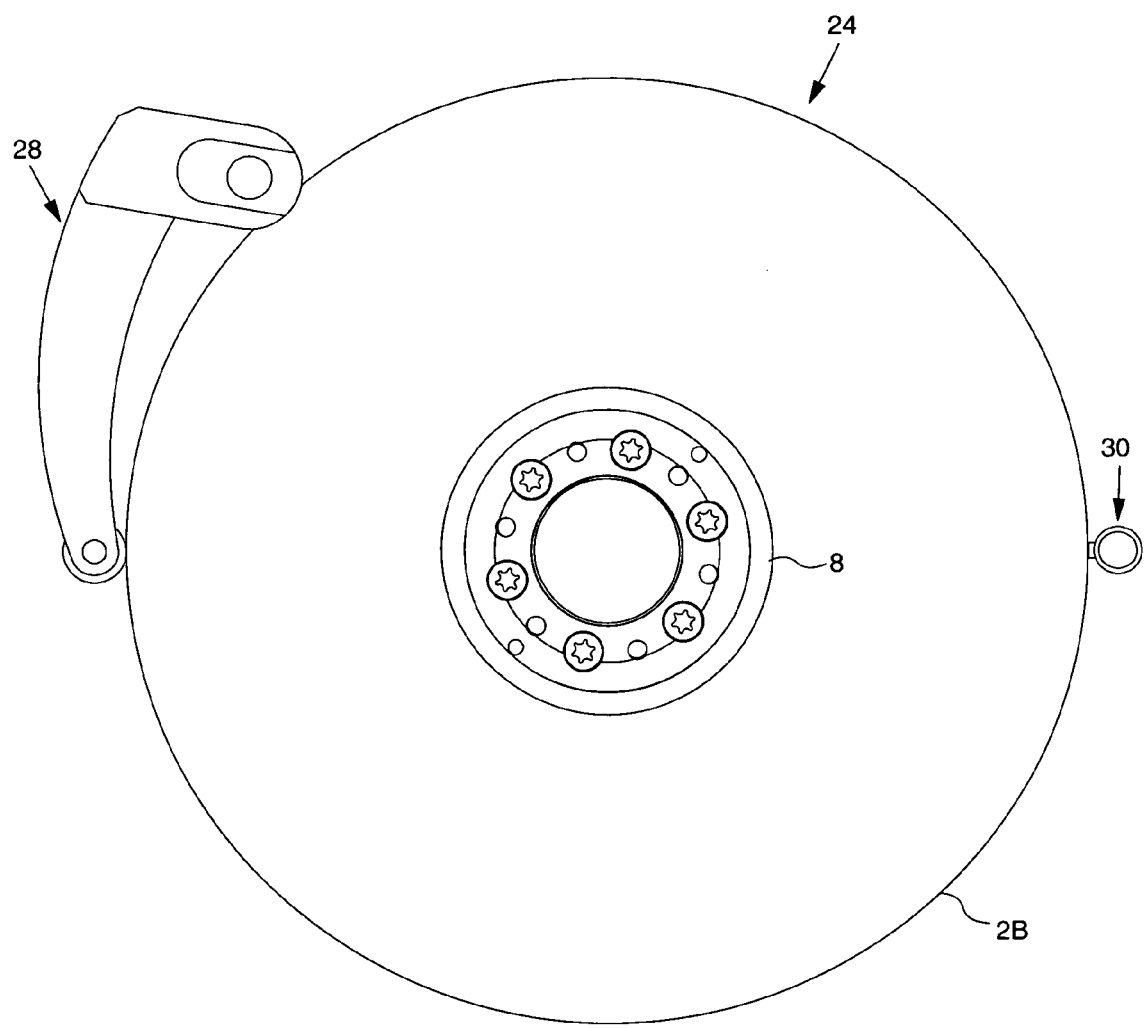
FIG. 6 shows a top view of the disk pack balancing station of FIG. 5 with the top disk removed to show the first biasing arm engaging the middle disk.

FIG. 5 shows an isometric view of the disk pack balancing station for balancing a disk pack assembly 24 comprising three disks (2A, 2B and 2C). In this embodiment, when the first biasing arm 28 is rotated about the pivot it applies a first biasing force to the middle disk 2B, and when the second biasing arm 30 is moved linearly it applies a second biasing force to the top disk 2A and bottom disk 2C. FIG. 6 shows a top view of the disk pack balancing station of FIG. 5 with the top disk 2A removed for a better view of the first biasing arm 28 engaging the middle disk 2B.

In the embodiments shown in FIG. 4 and FIG. 5, the disk pack balancing station is able to balance a disk pack assembly 24 having an even number of disks or an odd number of disks without changing the tooling on the assembly line. In embodiments employing more than three disks, the disk pack balancing station may comprise a number of biasing arms forming an E-block configuration that are rotated about a pivot to engage either a number of corresponding disk spacers 8 or a number of corresponding disks 2. In general, for disk pack assemblies 24 comprising an even number of disks, the first biasing arm 28 (or arms) engages one or more disk spacers 8, and for disk pack assemblies 24 comprising an odd number of disks, the first biasing arm 28 (or arms) engages one or more disks 2.

Figure 7A:
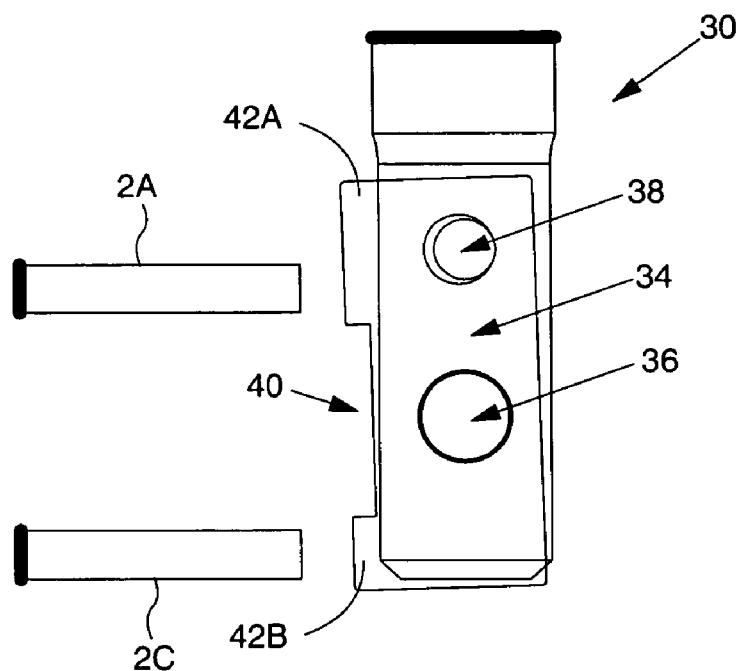
FIGS. 7A and 7B show a cross-sectional view of the second biasing arm comprising a swivel assembly including an abutment operable to rotate about a pivot according to an embodiment of the present invention.
Figure 7B:
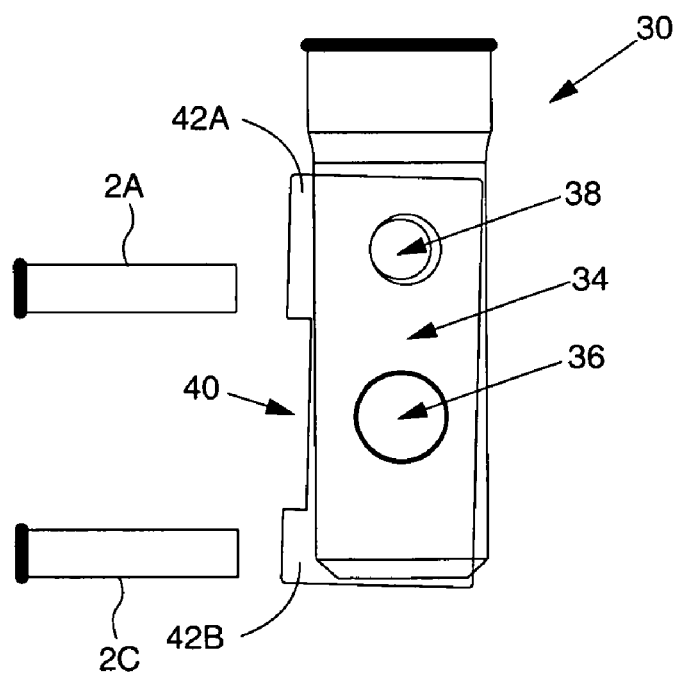

FIGS. 7A and 7B show a cross-sectional view of the second biasing arm 30 comprising a swivel assembly including an abutment 34 operable to rotate about a pivot 36 according to an embodiment of the present invention. In the embodiment of FIGS. 7A and 7B, the swivel assembly further comprises a pin 38 inserted through an aperture in the abutment 34 which limits the swivel motion of the abutment 34. As described above, the abutment 34 may engage the top disk 2A and bottom disk 2B in the embodiment of FIG. 3, or the top disk 2A and bottom disk 2C in the embodiment of FIG. 5. In one embodiment, the abutment 34 rotates about the pivot 36 in order to equalize the second biasing force applied to the two disks.

In one embodiment, in order to avoid having to swap out the second biasing arm 30 when switching from a disk pack assembly having an even number of disks (e.g., two disks) to a disk pack assembly having an odd number of disks (e.g., three disks), disk spacers 8 having a reduced thickness are employed. This allows the middle disk (e.g., disk 2B in FIG. 5) to fit into a corresponding opening 40 in the abutment (FIG. 7A), thereby enabling protruding elements 42A and 42B of the abutment to apply the second biasing force to the top and bottom disks (e.g., disks 2A and 2C in FIG. 5) while the first biasing arm 28 applies the first biasing force to the middle disk (e.g., disk 2B in FIG. 5).

The swivel assembly and abutment 34 shown in FIGS. 7A and 7B can easily be modified to accommodate four or more disks by increasing the number of protruding elements (42A and 42B) and associated openings 40. In an alternative embodiment, the second biasing arm 30 comprises a plurality of independent swivel assemblies that equalize the second biasing force applied to a corresponding pair of disks (or a single disk).

Biasing a disk spacer 8 in a first direction and the disks (2A and 2B) in an opposite direction as in the embodiment of FIG. 4, or biasing an odd number of disks against an even number of disks as in the embodiment of FIG. 5, helps to counter disk pack imbalance due to the eccentricity of the disks. In one embodiment, the disk pack assembly 24 is considered sufficiently balanced after using one of the balancing methods disclosed herein, and the disk pack assembly 24 is installed into a production disk drive without performing additional balancing steps. In an alternative embodiment, the balancing methods disclosed herein are intended to control the distribution of the disk pack assemblies prior to performing a final balancing procedure, such as the prior art wire balancing procedure. Controlling the distribution of the disk pack assemblies helps simplify the cost and complexity of the final balancing procedure. For example, with the prior art wire balancing procedure, controlling the distribution of the disk pack assemblies reduces the number of different length wires needed.

In the embodiments of the present invention, the first and second biasing forces may be applied in any suitable direction relative to one another. For example, applying the biasing forces in opposite directions helps counter disk pack imbalance, whereas applying the biasing forces with a different orientation (other than 180 degrees) may help to better control the distribution of the disk pack assemblies.

I claim:

1. A disk pack balancing station operable to balance a disk pack assembly, the disk pack assembly comprising a plurality of components including a plurality of disks coupled to a hub of a spindle motor with at least one disk spacer between the disks, the disk pack balancing station comprising:
   (a) a first biasing arm operable to rotate about a pivot to apply a first biasing force to a first component of the disk pack assembly; and
   (b) a second biasing arm operable to be moved linearly to apply a second biasing force to a second component of the disk pack assembly,
   wherein the first and second biasing arms are operable to apply the first and second biasing forces simultaneously.

2. The disk pack balancing station as recited in claim 1, wherein the first component comprises the at least one disk spacer.

3. The disk pack balancing station as recited in claim 1, wherein the first component comprises at least one of the disks.

4. The disk pack balancing station as recited in claim 1, wherein the second component comprises at least one of the disks.

5. The disk pack balancing station as recited in claim 1, wherein the disk pack balancing station is operable to balance a plurality of different disk pack assemblies, including a disk pack assembly comprising an odd number of disks and a disk pack assembly comprising an even number of disks.

6. The disk pack balancing station as recited in claim 5, wherein if the disk pack assembly comprises an even number of disks, the first component comprises the at least one disk spacer.

7. The disk pack balancing station as recited in claim 5, wherein if the disk pack assembly comprises an odd number of disks, the first component comprises a first one of the disks and the second component comprises a second one of the disks.

8. The disk pack balancing station as recited in claim 4, wherein the second biasing arm comprises a swivel assembly comprising an abutment operable to rotate about a pivot.

9. The disk pack balancing station as recited in claim 8, wherein:
   (a) the second component comprises at least two of the disks; and
   (b) the abutment is operable to rotate about the pivot in order to equalize the second biasing force applied to the at least two disks.

\* \* \* \* \*